2,801,912

PROCESS OF FORMING SYNTHETIC SOIL AND PRODUCT THEREOF

Harry Williams Charlton, London, Ontario, Canada

No Drawing. Application March 25, 1952, Serial No. 278,491

3 Claims. (Cl. 71—12)

This invention relates to a new and useful method of utilizing a by-product formed in the treatment of sewage. This by-product has great agricultural value as a soil conditioner. One feature that is to be particularly stressed is that this product is odorless and has a pleasing appearance and is in every way harmless while at the same time possessing marked growth producing properties. The material is digested activated sludge.

The object of this invention is to improve very poor soils with a minimum of labor and in addition to make use in an entirely new manner of a sewage by-product which at the present time has little commercial value. With these and other objects in view the invention consist in the various steps and combinations of steps all as set forth in the specification and particularly pointed out in the claims.

As an example of my invention I pump digested sludge in the form of a black liquid containing about 95% water on a sand-drying bed and allow to remain until the excess water has drained off and only a jelly remains. This jelly is skimmed off the bed and embedded in sand. The jelly then begins to permeate the sand and coats each sand grain and forms a true soil.

If it is desired to form a richer soil, plant food such as a solution of ammonium potassium phosphate is stirred into the jelly before it is embedded in the sand.

Although sand is named I wish it also to represent any granular soil as my invention may be applied to all of them.

The jelly may be surrounded by sand in numerous ways. A field of barren sand may be transformed into a free flowing soil area of excellent tilth and texture by simply plowing the same. To accomplish this a jelly carrying vehicle with a feeding device follows the plow and discharges the requisite amount of jelly into the furrow. When the next and parallel furrow is dug the sand from it completely covers the jelly in the first furrow.

I have discovered that the embedded jelly creeps throughout the sand and a true alluvial soil is formed.

Soils made according to my invention employing jelly of digested activated sludge enveloped in a large excess of coarse sand possess the following properties:

1. They are free flowing, easily worked.
2. They do not cake or form lumps.
3. They are jet black in color and retain the heat of sun due primarily to their black color.
4. Each grain of sand is covered with a coating of sludge. This would be impossible if the sludge had been dried and pulverized and mechanically mixed with the sand.
5. This soil permits the air to penetrate the mass freely. This air penetration is absolutely essential to the proper functioning of roots.
6. The water holding ability of this soil is remarkable.
7. The automatic ageing of the sludge during and due to its penetration of the sand is of especial importance.
8. If the sludge jelly has previously absorbed plant-foods as nitrates, phosphates or potash these foods will automatically be transported through the sand and are entirely and immediately available to the roots without loss.
9. It is thus apparent that the soil is automatically formed with any desired fertility. Thus a high nitrate or phosphate, or potash soil may be produced at the will of the operator.
10. There is another most important advantage of this invention. Of late it has been realized that trace elements like boron, manganese, zinc, molybdenum etc. are absolutely essential to plant growth. By my invention they may be introduced in the jelly easily in the best proportion possible.
11. As digested activated sludge is essentially available organic matter in which the nitrate and phosphate content is completely available to plant roots I can produce a synthetic soil of almost any composition at will. As its conductivity is low it will prohibit the too rapid heating or cooling of this soil. This is a great advantage.
12. There are additional advantages of this invention beside the mixing of the soil constituents. The tilth of the soil is vastly improved. In the case of barren sand and slulge jelly the particles are composed of sand grains in each case covered with a layer of organic matter.
13. This makes possible requisite soil aeration and also soil homogeneity. The plant roots penetrate with ease as the soil has elasticity. In the case of clover and other legumes the nitrogen fixing nodules are always surrounded by air and thus function more effectually. There is still a more important advantage—digested activated sludge is for a very considerable period poisonous to seeds and roots. Sludge burns roots and seeds until it is sufficiently aged. In our automatic soil this ageing is speeded up and the burning action is eliminated. Another and even more important advantage is that the soil assumes a jet black color and absorbs the heat of the sun to a marked degree.

Referring now to particular methods of carrying out the invention I believe the most practical method is to surround a mass of sludge in jelly form with sand and allow the mass to remain in the open and exposed to the elements.

The time consumed in the penetration of the sand etc. by the jelly depends on many factors and may require from a few months to years. In fact it goes on until all the jelly is deposited on the sand grains and the jelly condition has been transformed into a more stable form or physical condition.

The jelly may be formed in four ways.

1. The digested sludge as it leaves the digesters may be run on to beds in the open and the water automatically evaporated till a jelly is left.
2. The digested sludge as it leaves the digesters may be subjected to an elutriation action which highly concentrates the liquid and this may be further allowed to evaporate to form a jelly.
3. The digested sludge as it leaves the digesters may be run into ditches dug in a sand area and the material allowed to stand until the water evaporates to a point at which a jelly alone is left. As the ditches may be parallel the sand as it is excavated in one ditch may be used to cover the jelly in the adjoining ditch. This is a very practical method as the sand from adjoining ditches may thus be thrown on to the jelly which in turn permeates the entire mass and the soil is thus formed.
4. The digested activated sludge may be thickened by allowing it to stand. The solids will sink to the bottom. It takes quite a long time. By washing the separated solids with water, which is practically elutriation, the action may be speeded up and become more efficient.

I claim:

1. A process of forming synthetic soil which comprises pumping digested activated sludge from a digester onto a sand-drying bed; permitting it to remain until the excess water drains off and the resultant mass assumes the form of a jelly; skimming the jelly off the drying bed; embedding the jelly in mass form in sand and allowing sufficient time to elapse to permit the jelly to automatically creep throughout the sand and form a permanent coating on each grain; thereby forming a free flowing black soil of excellent tilth and remarkable texture.

2. A step in the process of forming a synthetic soil which comprises embedding digested activated sludge in form of a jelly in a mass of sand and allowing to remain until the jelly automatically permeates the sand and coats each sand particle; thereby forming a free flowing soil of excellent tilth and texture.

3. A step in the process of forming a synthetic soil which comprises embedding digested sludge in jelly form, carrying additional plant food, in sand and thereby enabling the jelly to automatically penetrate the sand and coat the individual sand grains; thereby forming a free flowing soil of excellent tilth and texture.

References Cited in the file of this patent

UNITED STATES PATENTS

| 1,123,414 | Smith | Jan. 5, 1915 |
| 1,132,171 | Dickson | Mar. 16, 1915 |
| 1,543,939 | Maclachlan | June 30, 1925 |
| 1,975,638 | Girard | Oct. 2, 1934 |
| 1,997,252 | Fischer | Aug. 9, 1935 |
| 2,117,808 | Jones | May 17, 1938 |

FOREIGN PATENTS

| 348,184 | Great Britain | May 8, 1931 |

OTHER REFERENCES

Sewerage and Sewage Treatment, Babbitt, sixth edition, 1947.

Sewage Treatment Works, Keefer, first edition, 1940.

American Sewerage Practice, Metcalf and Eddy, volume III (Disposal of Sewage), 1935.